D. H. GROGAN.
BICYCLE ATTACHMENT.
APPLICATION FILED OCT. 18, 1913.

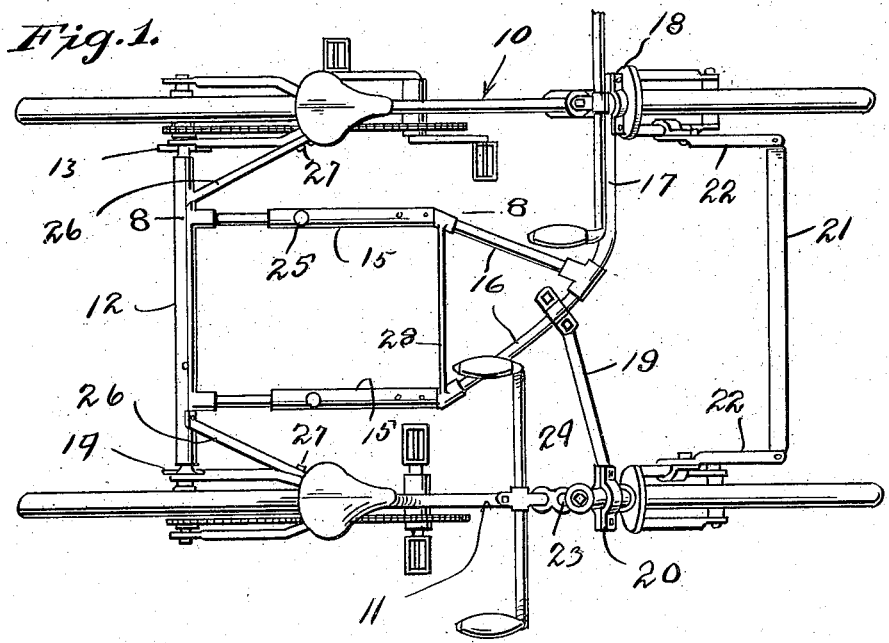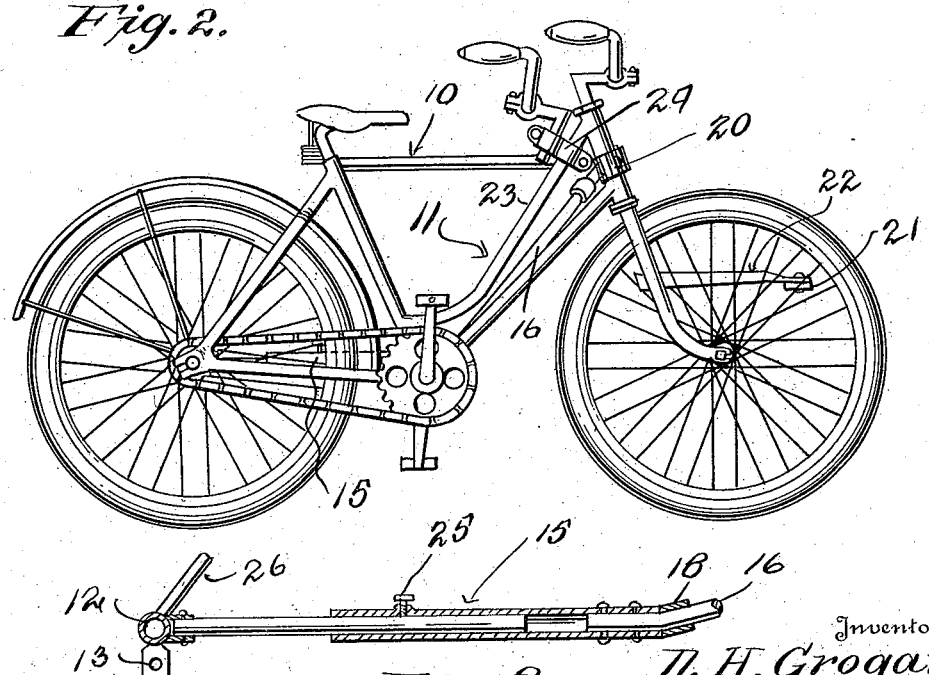

1,170,148.

Patented Feb. 1, 1916.
3 SHEETS—SHEET 2.

Inventor
D. H. Grogan.

Witnesses

By
Attorneys

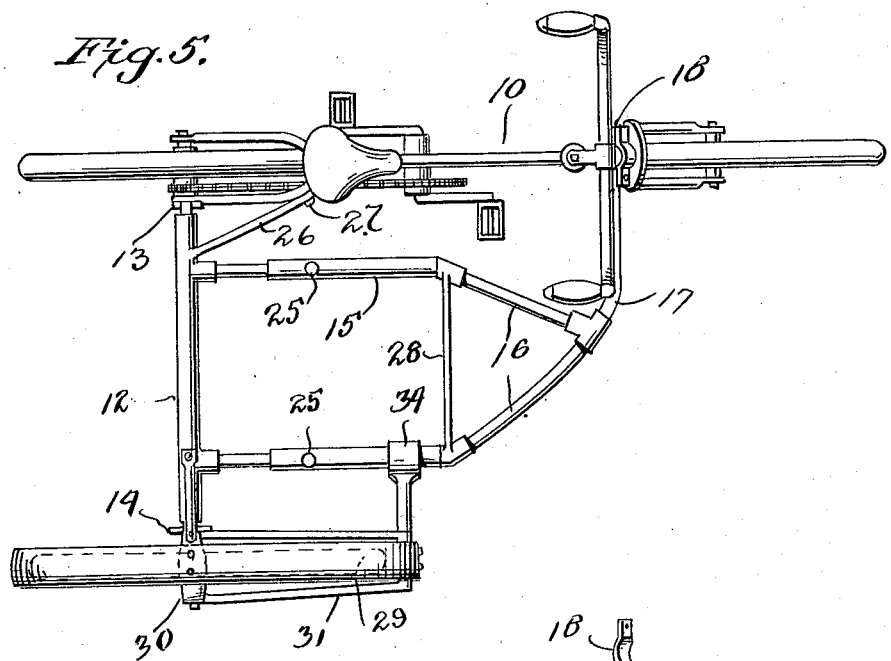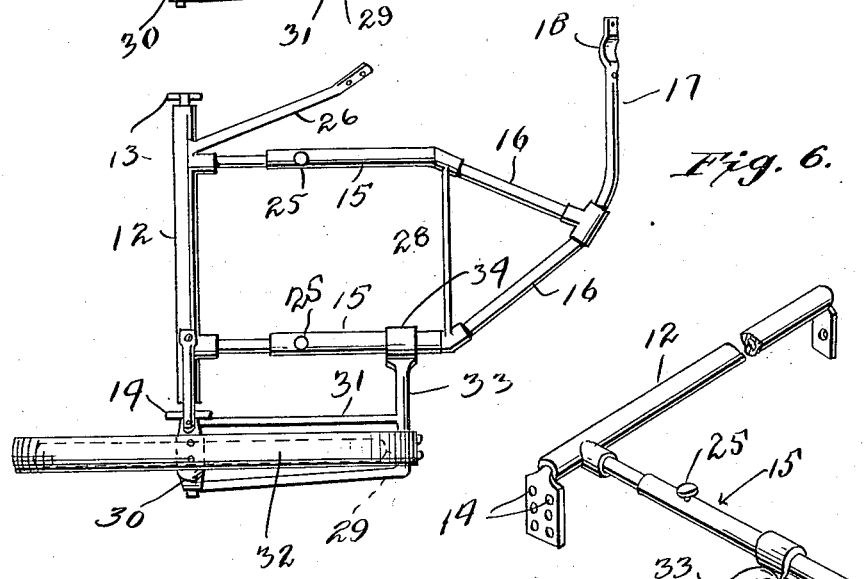

UNITED STATES PATENT OFFICE.

DAVID H. GROGAN, OF GADSDEN, ALABAMA.

BICYCLE ATTACHMENT.

1,170,148.  Specification of Letters Patent.  Patented Feb. 1, 1916.

Application filed October 18, 1913. Serial No. 795,937.

*To all whom it may concern:*

Be it known that I, DAVID H. GROGAN, a citizen of the United States, residing at Gadsden, in the county of Etowah, State of Alabama, have invented certain new and useful Improvements in Bicycle Attachments; and I do hereby declare the following to be a full, clear, and exact description of the invention, such as will enable others skilled in the art to which it appertains to make and use the same.

This invention relates to bicycle attachments and has for an object to provide a novel side frame which may be permanently attached to a gentleman's bicycle and to which frame a third wheel only or a lady's bicycle may be interchangeably secured.

A further object of the invention is to provide a frame of this character that will be light, strong and durable and will be formed of a few parts that will not easily get out of order.

With the above objects in view the invention consists of certain novel details of construction and combination of parts hereinafter fully described and claimed, it being understood that various modifications may be made in the minor details of construction within the scope of the appended claim.

Figure 4:
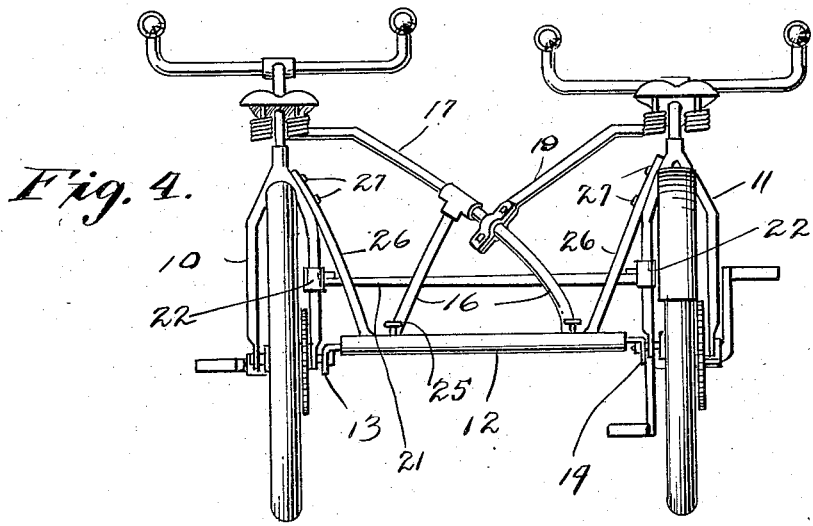
Figure 3:
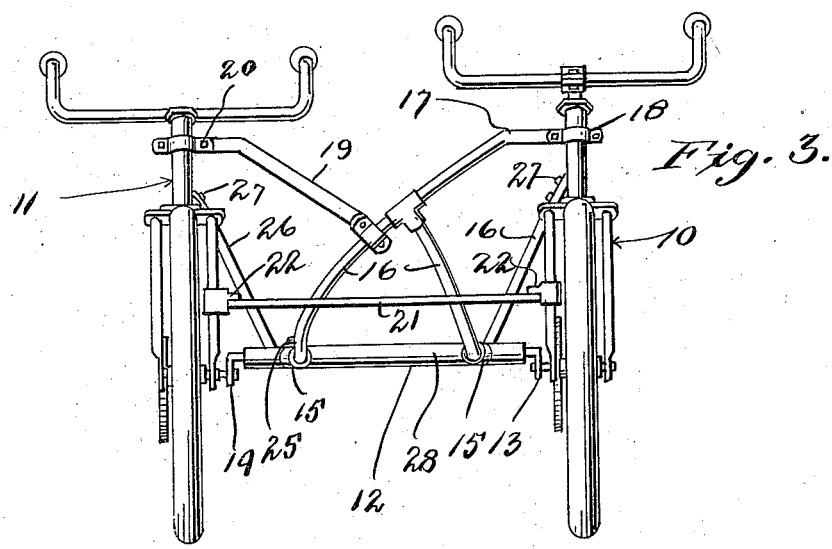

In the accompanying drawings illustrating this invention, Figure 1 is a plan view showing a gentleman's and lady's bicycle attached by my improved side frame. Fig. 2 is a side elevation. Fig. 3 is a front elevation. Fig. 4 is a rear elevation. Fig. 5 is a plan view showing a gentleman's bicycle and a third wheel secured to the frame. Fig. 6 is a plan view of the frame detached and showing the third wheel applied. Fig. 7 is a fragmentary perspective view of the rear axle and one of the braces. Fig. 8 is a longitudinal sectional view on the line 8—8 Fig. 5.

Referring now to the drawings in which like characters of reference designate similar parts, 10 designates a gentleman's bicycle and 11 a lady's bicycle, both of ordinary type.

The side frame comprises a rear axle 12 having one end bent downwardly as shown at 13 and provided with an opening to receive the spindle of the rear wheel of the gentleman's bicycle, while the opposite end of the axle is flattened and bent downwardly and provided with two vertical series of openings 14 to interchangeably receive the spindle of the rear wheel of the lady's bicycle or the spindle of a third wheel which will be hereinafter described.

Extending forwardly in parallel relation and at right angles to the rear axle are a pair of frame bars 15 which are bent upwardly and bent toward each other as shown at 16, one of the bars being bent laterally past the end of the other bar as shown at 17 and terminally equipped with a clamp 18 which embraces the steering head of the gentleman's bicycle. A brace 19 is secured to the last named bar and extends oppositely from the laterally directed end 17 thereof toward the lady's bicycle and is terminally equipped with a clamp 20 which embraces the steering head of the lady's bicycle.

It is desirable to have the dirigible front wheels of both bicycles turned simultaneously in either direction, and it is also desirable to have the steering done from the gentleman's bicycle alone, and to attain this end I provide a straight connecting bar 21 which is disposed horizontally between the forks of both bicycles and is pivotally connected at the ends with the forks of both bicycles by means of links 22 whereby upon the fork of the gentleman's bicycle being swung through the instrumentality of the handle bars the fork of the lady's bicycle will also be swung in the same direction. The handle bars of the lady's bicycle are removed from the steering head and applied to a brace 23 secured to the steering head of the lady's bicycle, by means of a clamp 24 whereby these handle bars are simply rests and perform no steering function.

Each of the longitudinal frame bars 15 is preferably formed of telescoping members as shown in Fig. 8 whereby the frame may be extended to fit bicycles of various lengths, such members being adjustably secured together by means of a set screw 25. There are a pair of upright braces 26 secured to the rear axle and extending upwardly for engagement with the rear forks of both bicycles whereby to anchor the bicycles in upright position, such braces being bolted at the upper ends as shown at 27 or otherwise removably secured to the bicycles. There is also a cross brace 28 terminally secured to the longitudinal frame bars 15 whereby spreading of the frame bars is positively prevented.

When it is desired to carry baggage instead of carrying the lady's bicycle on the side frame, the lady's bicycle together with the steering mechanism above described is detached from the side frame and in lieu thereof a third wheel 29 is secured to the rear axle of the side frame by means of passing the spindle of the wheel through one of the above mentioned openings 14. The third wheel is equipped with a vertically extending fork 30 and a horizontally forwardly extending fork 31 which forks are connected by a mud guard 32, the rear fork being held upright by one of the above mentioned braces 26, and the front fork that is, the horizontally extending fork being held in place by a lateral arm 33 which is directed toward the adjacent frame bar 15 and terminally flattened and bent downwardly to engage with a depending clip 34 through which and registering series of openings in the bent end of the arm and clip a bolt 35 is passed.

Any desired receptacle may be secured to the frame when the third wheel is in place in order to carry baggage of any kind. In constructing the parts of the invention above described all joints will preferably be brazed or otherwise rigidly secured together and the highest grade of bicycle steel tubing will be used in the construction.

From the above description it will be seen that I have provided an extremely simple, light, strong and durable side frame for attachment to a gentleman's bicycle, which frame may be utilized in interchangeably securing either a third wheel only or a lady's bicycle, and it will further be seen that the device is formed of a few parts that may be constructed at a minimum cost and will not easily get out of order.

What is claimed, is:—

In combination with a pair of bicycles, of a frame comprising an axle having its ends removably engaged with the rear axle spindles of the bicycle, adjustable parallel bars extending forwardly between the bicycles and having upwardly extending converging end bars, one of which extends laterally from the point of merging of said bars, and has its end detachably engaged with the steering head of one of the bicycles, a bar connecting one of the converging bars to the steering head of the other bicycle, and a horizontal bar having its ends pivotally connected to the front forks of both bicycles by links, said links having their inner ends detachably connected to the front fork of the bicycles.

In testimony whereof, I affix my signature, in the presence of two witnesses.

DAVID H. GROGAN.

Witnesses:
 A. F. HEATH.
 D. FAUCETT.

Copies of this patent may be obtained for five cents each, by addressing the "Commissioner of Patents, Washington, D. C."